Feb. 3, 1931.  A. L. WYATT  1,790,965
ANTIGLARE SHIELD
Filed Sept. 17, 1928
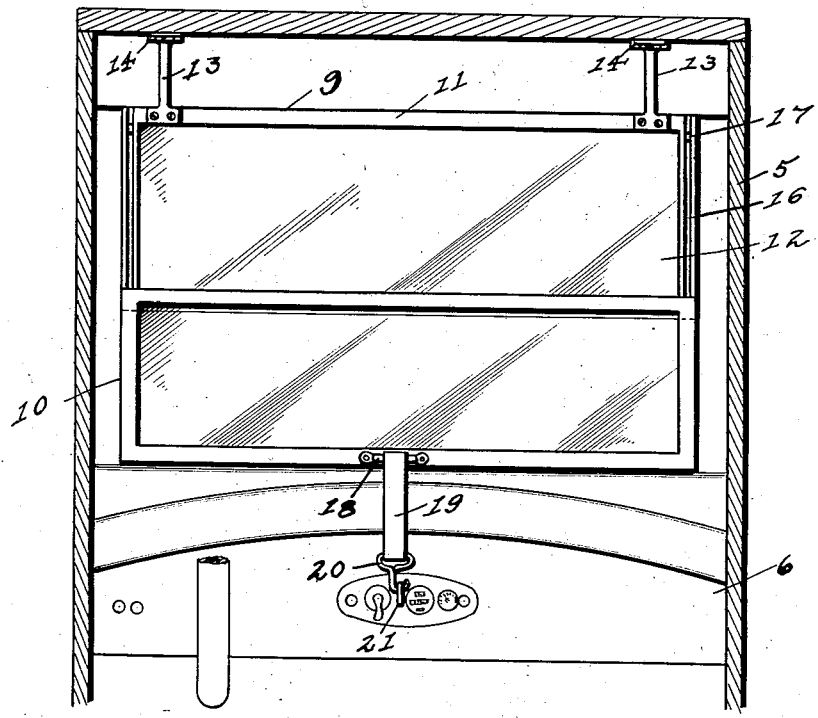
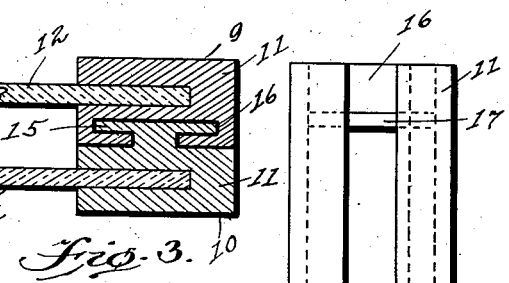
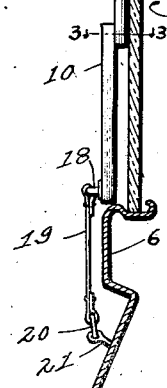
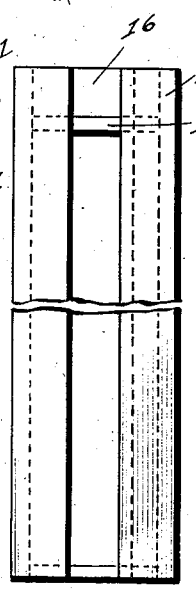
INVENTOR
A. L. Wyatt,
BY
Ralph Burch
ATTORNEY Patented Feb. 3, 1931

1,790,965

UNITED STATES PATENT OFFICE

ALVAH L. WYATT, OF NORA SPRINGS, IOWA

ANTIGLARE SHIELD

Application filed September 17, 1928. Serial No. 306,423.

My invention relates to antiglare shields for automobiles and the like and has for its primary object to provide a shield which covers the greater portion of the windshield of the vehicle, completely protecting the vision of the driver from the glare of headlights and the rays of the sun.

A further object of the invention is to provide a shield of the above-mentioned character which is readily collapsible, so it may be quickly and easily moved into and out of operative position.

Another object of the invention is to provide a shield of the above-mentioned character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1, is an inside view of a vehicle looking towards the windshield and showing my device is use, Fig. 2, is a vertical section of the windshield, showing the relative position of my shield with respect thereto, Fig. 3, is a cross section taken on lines 3—3 of Fig. 2, and, Fig. 4, is an enlarged view of the slot formed in the frame of the upper section of the shield.

In the drawing, wherein for the purpose of illustration, I have shown a preferred embodiment of my invention, the body of a conventional type of automobile is designated at 5, having the usual dash board 6, windshield 7 and visor 8.

Referring more particularly to my invention, the shield consists of upper and lower sections 9 and 10, each comprising a rectangular frame 11 having a pane of colored isinglass 12 or other suitable material. The sections are of such length as to extend almost the entire width of the windshield, the upper section being suspended from the top of the automobile by hangers 13 which are hingedly connected with the top, as at 14. The lower section 10 is slidably connected with the upper section by means of the T-shaped lugs 15 projecting from the corners of the frame of the lower section adapted to fit in the T-shaped slots 16 extending the length of the ends of the frame of the upper section, the slots being provided with abutments 17 adjacent the upper and lower ends of the slot, limiting the movement of the lower section. Thus, it is seen that the lower section is capable of sliding over the upper section, enabling the shield to be swung upwardly against the underside of the top of the automobile.

The lower section has a handle 18 attached to its bottom edge intermediate its ends and connected with the handle is a strap 19, preferably constructed of elastic material, having a hook 20 attached to its lower end adapted to engage an eye bolt 21 projecting from the dashboard. Thus, it is seen that the shield is held in close proximity to the windshield when in use. When the shield is swung upwardly beneath the top of the automobile, the hook 20 engages the eye bolt 22, holding the shield raised.

In use, it will be seen that the shield covers the greater portion of the windshield of the automobile, protecting the driver from the glare of headlights and the rays of the sun. Its construction permits the shield to be readily collapsed when not desired and swung to a position beneath the top of the automobile, where it is held until its use is desired again.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. The combination with the windshield of an automobile, of an anti-glare shield composed of upper and lower frames, transparent panes mounted in said frames, T- shaped lugs projecting outwardly from one face of the upper corners of the lower frame, said upper frame having vertical slots formed in one face of its ends, extending the full length thereof, said slots being of corresponding shape to said lugs in cross section and adapted to slidably receive said lugs, means at the ends of said slots for limiting the movement of said lower frame with respect to the upper frame, and hangers attached to the top of the upper frame hingedly connected to the top of the automobile, whereby the shield will be suspended in close parallel relation to the windshield.

2. The combination with the windshield of an automobile, of an anti-glare shield composed of upper and lower frames, transparent panes mounted in said frames, one of said frames having longitudinal slots formed in the face of its ends, T-shaped lugs projecting outwardly from one face of the upper corners of the other frame, adapted to fit in said slots, slidably connecting the frames together and maintaining the panes in spaced relation, hangers pivotally suspending the upper frame from the top of the automobile, and means for sliding the lower frame over the upper frame, said means being adapted to secure the shield in an operative or inoperative position.

In testimony whereof I affix my signature.

ALVAH L. WYATT.